United States Patent [19]

Uenaka et al.

[11] Patent Number: 5,585,146
[45] Date of Patent: Dec. 17, 1996

[54] TWO COAT ONE BAKE COATING METHOD

[75] Inventors: Akimitsu Uenaka, Suita; Teruaki Kuwajima, Higashiosaka, both of Japan

[73] Assignee: Nippon Paint Co., Ltd., Osaka, Japan

[21] Appl. No.: 397,724

[22] Filed: Mar. 2, 1995

Related U.S. Application Data

[63] Continuation of Ser. No. 167,346, Dec. 15, 1993, abandoned.

[30] Foreign Application Priority Data

Dec. 15, 1992 [JP] Japan ..................... 4-361758

[51] Int. Cl.$^6$ ....................................... B05D 1/36
[52] U.S. Cl. ................ 427/407.1; 427/195; 427/202; 427/410
[58] Field of Search ................ 427/407.1, 409, 427/410, 386, 202, 193, 388.4, 195

[56] References Cited

U.S. PATENT DOCUMENTS

| | | | |
|---|---|---|---|
| 3,959,405 | 5/1976 | Labana et al. | 427/195 |
| 4,011,188 | 3/1977 | Ruter et al. | 427/185 |
| 4,142,018 | 2/1979 | Ozawa et al. | 427/375 |
| 4,323,600 | 4/1982 | Sakata et al. | 427/195 |
| 4,346,144 | 8/1982 | Craven | 428/335 |
| 4,489,135 | 12/1984 | Drexler et al. | 427/407.1 |
| 4,650,718 | 3/1987 | Simpson et al. | 427/407.1 |
| 4,681,811 | 7/1987 | Simpson et al. | 427/407.1 |
| 4,812,335 | 3/1989 | Kuwajima et al. | 427/409 |
| 4,849,283 | 7/1989 | Porter, Jr. et al. | 427/407.1 |
| 5,151,125 | 9/1992 | Kuwajima et al. | 106/415 |
| 5,183,504 | 2/1993 | Kuwajima et al. | 106/404 |
| 5,212,243 | 5/1993 | Toyoda et al. | 525/187 |
| 5,322,715 | 6/1994 | Jouck et al. | 427/409 |
| 5,342,882 | 8/1994 | Göbel et al. | 427/388.4 |
| 5,368,944 | 11/1994 | Hartung et al. | 427/407.1 |
| 5,368,945 | 11/1994 | Hardeman et al. | 427/386 |
| 5,380,565 | 1/1995 | Gross et al. | 427/386 |
| 5,397,603 | 3/1995 | Okude et al. | 427/410 |
| 5,407,706 | 4/1995 | Kano et al. | 427/386 |
| 5,439,710 | 8/1995 | Vogt et al. | 427/410 |

FOREIGN PATENT DOCUMENTS

| | | |
|---|---|---|
| 0045040 | 7/1981 | European Pat. Off. . |
| 0089497 | 2/1983 | European Pat. Off. . |

*Primary Examiner*—Diana Dudash
*Attorney, Agent, or Firm*—Townsend & Banta

[57] ABSTRACT

The present invention relates to a two coat one bake coating method in which the aqueous base coating composition and the powder clear coating composition are applied onto substrates in automobile painting processes. In accordance with the present invention, the aqueous base coat contains: (a) a vinyl polymer prepared by copolymerizing 8 to 30% by weight of an amido group containing ethylenic monomer, an acidic group containing ethylenic monomer, a hydroxyl group containing ethylenic monomer and at least one other ethylenic monomer; (b) an aqueous dispersion of hydrophilic group containing oligomers; and (c) pigment. The clear powder coating composition comprises an epoxy group containing acrylic resin, and may carry polymer microparticles on each powder particle.

12 Claims, No Drawings

TWO COAT ONE BAKE COATING METHOD

CROSS REFERENCE TO A RELATED APPLICATION

This is a file wrapper continuation application of application Ser. No. 08/167,346, filed Dec. 15, 1993, now abandoned.

FIELD OF THE INVENTION

The present invention relates to a two coat one bake coating method in which a base coating composition and a clear coating composition are applied onto coated plates one after another and then cured or baked simultaneously, in automobile painting processes.

BACKGROUND OF THE INVENTION

In the conventional automobile painting processes, a metallic coating composition containing a metallic pigment is applied to coated sheets or plates having an undercoat layer and an intermediate coat layer to form an overcoat or top coat layer and then a clear coat paint is further applied onto the top coat layer by the wet-on-wet method without curing said top coat layer. The metallic base coating and clear coating are then simultaneously cured or baked. This is the so-called two coat one bake coating method (2C1B method).

From the health and environment protection view points, it is desirable that such paints be in the form of aqueous or powder coating compositions, not in the form of solvent types.

In the case of 2C1B method, it is the most practical that the metallic base coating composition is in the form of an aqueous coating composition and the clear coating composition is in the form of a powder coating composition.

In an attempt to provide aqueous metallic base coating compositions, Japanese Kokai Publication Sho-58-168664, for instance, discloses the use of aqueous dispersions of polyurethanes for the preparation of metallic base coating compositions, while Japanese Kokai Publication Hei-01-287183 discloses aqueous metallic base coating compositions containing an acrylic emulsion, a urethane emulsion and a cross linking agent.

However, such coating compositions are not yet satisfactory in the orientation of metallic pigments contained therein, hence the resulting paint films are not fully satisfactory in appearance.

The present inventors previously proposed an aqueous metallic coating composition in which a mixture composed of (a) 95 to 10% by weight (as solids) of a film-forming polymer prepared by copolymerizing amide group-containing ethylenic monomers, acidic group-containing ethylenic monomers, hydroxyl group-containing ethylenic monomers and other monomers to give a copolymer having a number average molecular weight of 6,000 to 50,000, and neutralizing at least part of the acidic groups of said copolymer, and (b) 5 to 90% by weight (as solids) of a urethane-containing aqueous dispersion prepared by dispersing, in a primary and/or secondary polyamine containing aqueous medium, hydrophilic group-containing oligomers produced by reacting a hydroxyl-terminated diol compound or compounds having a molecular weight of 100 to 5,000, a diisocyanate compound or compounds and a hydrophilic group-containing compound or compounds having at least one active hydrogen atom within the molecule together is used (Japanese Kokai Publication Hei-04-025582).

When the aqueous metallic coating composition mentioned above is used in combination with solvent type clear paints comprising acrylic resin varnishes, melamine resin varnishes and acrylic polymer micro particles incorporated therein, or solvent type clear paints comprising an acrylic resin varnish, isocyanate curing agent, high nonvolatile matter contents can be accomplished and, in addition, very excellent orientation of metallic pigments or, in other words, excellent paint film appearance, can be attained.

However, nothing is mentioned of any powder clear coating composition in Japanese Kokai Publication Hei-04-025582.

When the base coating composition is aqueous and a powder clear coating is applied without curing the base, the powder coating composition shows a higher viscosity and a greater degree of shrinkage upon cooling than the base paint film surface of the base coating composition. As a result, the paint interface is disturbed and the appearance tends to deteriorate. Attempts to develop a two coat one bake method in which an aqueous coating composition and a powder clear coating composition are used have been unsuccessful.

Thus, in Japanese Kokai Publication Sho-52-069446, application of an aqueous base coating composition is followed by preheating under very particular conditions so that the volatile matter content in the paint film can become 6% or lower. Then, a powder coating composition is applied and baking is performed.

In view of the foregoing, the advent of a two coat one bake method capable of giving coatings excellent in appearance by applying an aqueous base coating composition and then, without curing the base, applying a powder clear coating composition, followed by baking is awaited. It is an object of the present invention to meet such demand.

DETAILED DESCRIPTION OF THE INVENTION

In accordance with the present invention, the above object can be accomplished by providing a two coat one bake coating method which comprises applying, to a substrate, an aqueous base coating composition prepared by dispersing, in an aqueous dispersion composition comprising (a) 95 to 10% by weight (as solids) of a film-forming vinyl polymer prepared by copolymerizing 5 to 40% by weight of an amido group-containing ethylenic monomer or monomers, 3 to 15% by weight of an acidic group-containing ethylenic monomer or monomers, 10 to 40% by weight of a hydroxyl group-containing ethylenic monomer or monomers and at least one other ethylenic monomer accounting for the balance, to give a copolymer having a number average molecular weight of 6,000 to 50,000, and neutralizing at least part of the acidic groups of said copolymer, and (b) 5 to 90% by weight (as solids) of an aqueous dispersion prepared by dispersing, in a primary or secondary polyamine or both containing aqueous medium, hydrophilic group-containing oligomers produced by reacting a hydroxyl-terminated diol compound or compounds having a molecular weight of 100 to 5,000, a diisocyanate compound or compounds and a hydrophilic group-containing compound or compounds having at least one active hydrogen atom within the molecule together under isocyanate-rich conditions, (c) 2 to 100 parts by weight, per 100 parts by weight of the above aqueous dispersion composition (as solids), of a pigment, then applying a clear powder coating composition comprising an epoxy group-containing acrylic resin produced by copolymerizing 35 to 65% by weight of an epoxy group-containing monomer or monomers and 65 to 35% by weight of at least one other ethylenic monomer unreactive with epoxy groups, and a polycarboxylic acid or acids, with an acrylic resin epoxy group/polycarboxylic acid carboxyl group number ratio of 10/6 to 10/10, and baking or curing the coatings.

The aqueous base coating composition to be used in accordance with the present invention is prepared by dispersing a pigment in a mixture, in specific proportions, of an amide group-containing specific vinyl polymer and an aqueous dispersion of urethane-containing oligomers.

For the production of the film-forming vinyl polymer (a) to be used in the practice of the present invention, (meth)acrylamides are generally used as the amide group-containing ethylenic monomers.

Examples of such (meth)acrylamides include acrylamide, methacrylamide, N,N-dimethylacrylamide, N,N-dimethylmethacrylamide, N,N-dibutylacrylamide, N,N-dibutylmethacrylamide, N,N-dioctylacrylamide, N,N-dioctylmethacrylamide, N-monobutylacrylamide, N-monobutylmethacrylamide, N-monooctylacrylamide and N-monooctylmethacrylamide, among which acrylamide and methacrylamide are preferred.

The acidic group in the acidic group-containing ethylenic monomers is, for example, a carboxyl group or a sulfo group.

Typical carboxyl-containing monomers are styrene derivatives (e.g. 3-vinylsalicylic acid, 3-vinylacetylsalicylic acid, etc.) and (meth)acrylic acid and derivatives thereof (e.g. acrylic acid, methacrylic acid, crotonic acid, isocrotonic acid, etc.). Typical sulfo-containing ethylenic monomers are p-vinylbenzenesulfonic acid and 2-acrylamidopropane sulfonic acid.

The acidic group-containing ethylenic monomers may be in the form of half esters, half amides or half thioesters of dibasic acid monomers.

Examples of such are half esters, half amides and half thioesters of maleic acid, fumaric acid or itaconic acid. The half ester-forming alcohols may contain 1 to 12 carbon atoms and include, among others, methanol, ethanol, propanol, butanol, methyl cellosolve, ethyl cellosolve, dimethylaminoethanol, diethylaminoethanol, acetol, allyl alcohol and propargyl alcohol, among which butanol, dimethylaminoethanol, diethylaminoethanol, acetol, allyl alcohol and propargyl alcohol are preferred.

The half thioester-forming mercaptans may contain 1 to 12 carbon atoms and include ethyl mercaptan, propyl mercaptan, butyl mercaptan, etc.

The half amide-forming amines may contain 1 to 12 carbon atoms and include, among others, ethylamine, diethylamine, butylamine, dibutylamine, cyclohexylamine, aniline and naphthylamine. Half thioesters may offer an odor problem, though minor.

Thus, half esters and half amides are preferred. The half esterification, half thioesterification and half amidation reactions can be carried out in the conventional manner at a temperature between room temperature and 120° C., using, where appropriate, a tertiary amine as a catalyst.

As examples of the hydroxyl group-containing ethylenic monomers, there may be mentioned 2-hydroxyethyl acrylate, 2-hydroxypropyl acrylate, 2-hydroxy ethyl methacrylate, 2-hydroxypropyl methacrylate, 2,4-dihydroxy-4'-vinylbenzophenone, N-(2-hydroxyethyl)acrylamide and N-(2-hydroxyethyl) methacrylamide.

The film-forming vinyl polymer of the present invention can be prepared by copolymerizing the above-mentioned monomers with one or more other ethylenic monomers by a per se known method.

Said other ethylenic monomers include styrene, α-methylstyrene, acrylic acid esters (e.g. methyl acrylate, ethyl acrylate, butyl acrylate, 2-ethylhexyl acrylate) and methacrylic acid esters (e.g. methyl methacrylate, ethyl methacrylate, butyl methacrylate, isobutyl methacrylate, p-butyl methacrylate), among others.

For preparing the above-mentioned film-forming vinyl polymer, the amide group-containing ethylenic monomers are used in a proportion of 5 to 40% by weight, preferably 8 to 30% by weight.

When the proportion is below 5%, the orientation of metallic pigment scales will be insufficient, hence the appearance will be poor. When the proportion is above 40% by weight, the paint films formed will have poor water resistance.

The acidic group-containing ethylenic monomers are used in an amount of 3 to 15% by weight, preferably 5 to 13% by weight; when he proportion is below 3% by weight, poor water dispersibility will result and, when the proportion is above 15% by weight, the water resistance of paint films will be unsatisfactory.

The hydroxyl group-containing ethylenic monomers are used in an amount of 10 to 40% by weight, preferably 13 to 30% by weight. When they are used in an amount less than 10% by weight, the film curability will be low. If they are used in an amount exceeding 40% by weight, the paint films will show decreased water resistance.

The polymer obtained should have a number average molecular weight of 6,000 to 50,000, preferably 8,000 to 30,000. When the molecular weight is below 6,000, the applicability and curability will be insufficient. When it exceeds 50,000, the non volatile matter content must be too low, hence the applicability will be poor. The molecular weight is determined by gel permeation chromatography (GPC).

The hydroxyl-terminated diol compounds with a molecular weight of 100 to 5,000, which are to be used for the production of the aqueous dispersion (b) according to the present invention, are generally polyether diols or polyester diols.

Examples are polymers or copolymers of alkylene oxides (ethylene oxide, propylene oxide, methylene oxides, etc.) or heterocyclic ethers (tetrahydrofuran etc.), such as poly ethylene glycol, polypropylene glycol, polyethylene-propylene glycol, polytetramethylene ether glycol, polyhexamethylene ether glycol, polyoctamethylene ether glycol, etc.; polyethylene adipate, polybutylene adipate, polyhexamethylene adipate, polyneopentyl adipate, poly-3-methylpentyl adipate, polyethylene-butylene adipate, polyneopentyl-hexyl adipate; polylactone diols, such as polycaprolactone diol, poly-3-methylvalerolactone diol, etc.; polycarbonate diols; and mixtures of these.

The diisocyanate compounds to be used in the practice of the present invention include aliphatic diisocyanates, such as hexamethylene diisocyanate, 2,2,4-trimethylhexane diisocyanate, lysine diisocyanate, etc.; alicyclic diisocyanates containing 4 to 18 carbon atoms, such as 1,4-cyclohexane diisocyanate, 1-isocyanato-3-isocyanatomethyl-3,5-trimethytcyclohexane (isophorone diisocyanate), 4,4'-dicyclohexylmethane diisocyanate, methylcyclohexylene diisocyanate, isopropylidenedicyclohexyl-4,4'-diisocyanate, etc.; modifications of these diisocyanates; and mixtures of these.

Preferred among them are hexamethylene diisocyanate, isophorone diisocyanate and the like.

The hydrophilic group-containing compounds containing at least one active hydrogen atom within the molecule, which are to be used in the practice of the present invention, are, for example, hydroxyl group- and carboxyl group-containing compounds, such as dimethylolacetic acid, dimethylolpropionic acid, dimethylolbutyric acid and the like. Among them, dimethylolpropionic acid is preferred.

For preparing the hydrophilic group-containing oligomers according to the present invention, the reaction is carried out under isocyanate-rich conditions, for example within the NCO/OH equivalent ratio range of 1.1 to 1.9. The reaction can readily proceed when all the reactant compounds are mixed up. Where appropriate, the reaction may be carried out in a solvent.

The hydrophilic group-containing oligomers obtained are dispersed in an aqueous medium containing primary or secondary polyamines or both.

In this dispersion step, the hydrophilic groups in the hydrophilic group-containing oligomers are neutralized.

The neutralization is performed in the conventional manner using a base (e.g. monomethylamine, dimethylamine, trimethylamine, triethylamine, diisopropylamine, monoethanol amine, diethanolamine, dimethylethanol amine, etc.).

The aqueous base coating composition of the present invention is generally supplemented with a curing agent for use thereof as a curable aqueous base coating composition. Melamine resins are generally used as the curing agent and, among them, water-soluble melamine resins are preferred, including, for example, Cymel 303 available from Mitsui Toatsu Chemicals, Inc. and Sumimal N-W available from Sumitomo Chemical Company, Ltd. The melamine resins are not limited to these particular species but water-insoluble melamine resins can be used as well. The melamin resins are used in an amount of 5 to 60% by weight relative to the film-forming vinyl polymer (a) (as solids). When the melamin resin content is too small, the curability will be insufficient while excessively high contents render the cured films too rigid, hence brittle.

The aqueous base coating composition of the present invention further comprises one or more metallic pigments (e.g. aluminum pigment, bronze pigment, mica, gold pigment, silver pigment). The metallic pigments are incorporated therein in an amount of 2 to 100 parts by weight per 100 parts (as solids) of the aqueous base coating composition. Furthermore, various additives (e.g. ultraviolet absorber, defoamer, surface modifier, etc.) and a conventional inorganic pigment or pigments may be added, as necessary, to the aqueous base coating composition of the present invention.

It has been found that when the above-mentioned aqueous base coating composition is used, wet paint films excellent in strength can be obtained since the amide group-containing vinyl resin and urethane bond-containing oligomers both show very strong cohesion and that, therefore, the subsequent application of a powder clear coating composition without curing the base coating causes little disturbance in the interface, giving coatings excellent in appearance.

In the practice of the present invention, the application of the above aqueous base coating composition is followed by application of a powder clear coating composition without curing the former composition, as mentioned above. Preferred as said powder clear coating composition is one comprising an epoxy group-containing acrylic resin and a polybasic carboxylic acid or acids.

In that case, the epoxy group-containing acrylic resin is, for example, a resin produced by copolymerizing 35 to 65% of an epoxy group-containing monomer or monomers, such as glycidyl acrylate and glycidyl methacrylate, with 65 to 35% by weight of at least one ethylenically unsaturated monomer unreactive with epoxy groups and having a glass transition temperature of 25° to 80° C.

The polybasic carboxylic acids may arbitrarily be selected from among aliphatic, alicyclic, and aromatic dicarboxylic acids or other polybasic carboxylic acids, for example, decanedicarboxylic acid is preferred.

The resin and polybasic carboxylic acids are mixed in an epoxy group/carboxyl group equivalent ratio of 10/6 to 10/10 and, after addition, as desired, of a film surface modifier, an anticissing agent and the like, the mixture is subjected to per se known powder preparation steps, such as blending, melting, kneading, cooling, pulverizing, classification and like steps.

When the epoxy group-containing monomers are used in an amount below 35%, the degree of freedom in resin designing becomes too low from the practical viewpoint whereas when they are used in an amount exceeding 65% by weight, the curability will be low. From the curability and paint film hardness viewpoints, the proportions of the epoxy groups and carboxyl groups are preferably within the range mentioned above.

It has also been established that the powder clear coating composition should have an average particle size of not greater than 15 μm for effective evaporation of the volatile matter in the step of paint film formation and for attaining a good paint film appearance. For effectively inhibiting blocking of the powder clear coating composition itself during storage, it is particularly preferable that the powder particles carry, at least on the surface thereof, polymer micro particules having an average particle size of 0.001 to 10 μm, a glass transition temperature of 50° to 150° C. and a solubility parameter (SP) of 9 to 15.

The two coat one bake coating method according to the present invention, in which application of the above-mentioned aqueous base coating composition is followed, without curing the same, by application of the above-mentioned powder clear coating composition and further followed by curing by baking, can attain automobile top coat layer particularly excellent in appearance.

Since the aqueous base coating composition of the present invention contains particular resin components, the disturbance of the base/powder interface is effectively inhibited in the steps of flowing of the powder clear coating composition and curing/shrinking, whereby coatings excellent in appearance can be obtained by the two coat one bake coating method without encountering the solvent-caused health and environment problems. The coating method provided by the present invention is advantageous from the economic viewpoint as well.

EXAMPLES

The following production examples, working examples and comparative examples further illustrate the present invention, but the present invention is not limited by them.

In those, "part(s)" means "part(s) by weight".

Production of Film-Forming Vinyl Polymer (I)

Production Example 1

A one-liter reaction vessel equipped with a stirrer, a temperature regulator and a condenser was charged with 76 parts of ethylene glycol monobutyl ether, followed by further addition of a 61 parts portion of a monomer solution comprising 15 parts of styrene, 63 parts of methyl methacrylate, 48 parts of 2-hydroxydiethyl methacrylate, 117 parts of n-butyl acrylate, 27 parts of methacrylic acid, 30 parts of acrylamide and 3 parts of azobisisobutyronitrile.

The mixture was heated to 120° C. with stirring. Then, the remaining 245 parts of the above monomer solution was added thereto over 3 hours and the resultant mixture was stirred for 1 hour. Addition thereto of 28 parts of dimethylethanolamine and 200 parts of deionized water gave an acrylic resin varnish (A) with a nonvolatile matter content of 50%. The resin had a number average molecular weight of 12,000 and was characterized by its OH value of 70 and its acid value of 58.

Production Example 2

A three-liter reaction vessel equipped with a nitrogen gas introducing tube, a temperature controller, a dropping funnel, a stirrer and a decanter was charged with 500 parts of 2-ethoxypropanol and the temperature was raised to 100° C. The dropping funnel was charged with a solution composed of 50 parts of styrene monomer, 50 parts of methyl methacrylate, 200 parts of 2-hydroxyethyl methacrylate, 120 parts of 2-ethylhexyl methacrylate, 380 parts of butyl acrylate, a solution of 100 parts of monobutyl maleate and 100 parts of acrylamide in 300 parts of methanol, and 30 parts of azobisisobutyronitrile (polymerization initiator).

The monomer-initiator solution was added dropwise to the reaction vessel over 3 hours while the temperature was maintained at 100° C. and the methanol distilled off by means of the decanter. After further 30 minutes of stirring, a solution composed of 50 parts of butyl acetate and 3 parts of tert-butyl peroxy-2-ethylhexanoate was added dropwise over 0.5 hour. The resultant mixture was maintained at 100° C. for 1.5 hours, during which the amount of the methanol distilled off amounted to 300 parts.

Then, 220 parts of the solvent was distilled off under reduced pressure. Further addition of 100 parts of dimethylethanolamine and 570 parts of deionized water for dissolving the remaining mixture gave a clear and viscous acrylic resin varnish (B) with a nonvolatile matter content of 50%. The resin, which was soluble in water, had a number average molecular weight of 10,000.

Production Example 3

Film-Forming Vinyl Polymer used in Comparative Examples

An acrylic resin varnish (C) for comparison was prepared in the same manner as in Production Example 1 except that the amount of styrene was increased to 45 parts and the use of acrylamide omitted.

Production of Urethane Group-Containing Aqueous Dispersion (II)

Production Example 4

Synthesis of Hydrophilic Group-Containing Oligomers

A 1,000 ml reaction vessel equipped with a thermometer, a stirrer and a condenser was charged with 40.2 parts of dimethylolpropionic acid, 30 parts of triethyl amine and 312 parts of N-methylpyrrolidone, and the contents were heated to 90° C. for dissolution. Then, 290 parts of isophorone diisocyanate and 700 parts of polypropylene glycol (molecular weight: 1,000) were added. The resultant mixture was stirred for 10 minutes and then 1.03 parts of dibutyltin dilaurate was added. The whole mixture was heated to 95° C. for 1 hour for effecting the urethane prepolymer formation reaction.

Preparation of Aqueous Dispersion

A 5,000 ml reaction vessel equipped with a thermometer, a stirrer, a condenser and a dropping funnel was charged with 1,757 parts of deionized water and 9.2 parts of hydrazine hydrate. Thereto was added, with stirring, the urethane prepolymer solution obtained as described above. The mixture was then stirred for 30 minutes. The thus-obtained composition occurred as a turbid but stable aqueous dispersion (D). The solid matter contained therein had an acid value of 16.2. The nonvolatile matter content was 33%.

Production Example 5

Synthesis of Hydrophilic Group-Containing Oligomers

The same reaction vessel as used in Production Example 3 was charged with 40.2 parts of dimethylolpropionic acid, 30 parts of triethylamine and 402 parts of N-methylpyrrolidone, and the charge was heated to 90° C. for causing dissolution. Then, 290 parts of isophorone diisocyanate, 400 parts of polypropylene glycol (molecular weight: 1,000) and 600 parts of polypropylene glycol (molecular weight: 2,000) were added. The mixture was stirred for 10 minutes and, after addition of 1.3 parts of dibutyltin dilaurate, the mixture was heated to 95° C. and maintained at that temperature for 1 hour for effecting the urethane prepolymer formation reaction.

Preparation of Aqueous Dispersion

The same reaction vessel as used in Production Example 3 was charged with 2,293 parts of deionized water and 11.5 parts of hydrazinc hydrate. Thereto was added, with stirring, the urethane prepolymer solution obtained as mentioned above. The mixture was stirred for 30 minutes. The thus-obtained composition occurred as a turbid but stable aqueous dispersion (E). The solid matter contained therein had an acid value of 12.5. The nonvolatile matter content was 33%.

Production Example 6

The reaction was carried out in the same manner as in Production Example 4 except that polycarbonate diol (Daicel Chemical Industries' PLACCEL CD-211PL; molecular weight; 1,000) was used in lieu of polypropylene glycol (molecular weight: 1,000). An aqueous dispersion (F) in which the solids had an acid value of 16.0 and the nonvolatile matter content was 33% was prepared in the same manner.

Production Example 7

Production of Acrylic Resin Varnish (G) used in Preparing Pigment Pastes

A one-liter reaction vessel equipped with a stirrer, a temperature controlling device and a condenser was charged with 40 parts of ethoxypropanol. Thereto was added dropwise over 3 hours monomer solution (121.7 parts) composed of 4 parts of styrene, 35.96 parts of n-butyl acrylate, 18.45 parts of ethyl hexyl methacrylate, 13.92 parts of 2-hydroxyethylmethacrylate, 7.67 parts of methacrylic acid, a solution (40 parts) of 20 parts of acid phosphoxyhexa(oxypropylene) monomethacrylate in 20 parts of ethoxypropanol, and 1.7 parts of azobisisobutyronitrile. The resultant mixture was stirred for 1 hours. The thus-obtained acrylic varnish (G) has a nonvolatile matter content of 63%, with an acid value of 105, an OH value of 60 and a number average molecular weight of 6,000.

Preparation of Aqueous Base Coating Composition

Production Example 8

Cymel 303 (30 parts; Mitsui Toatsu Chemicals' methoxylated methylol melamine) was added to 15 parts of an aluminum pigment paste (Toyo Aluminium's Alpaste 7160N; Al metal content 65%), followed by uniform mixing. Further, 2 parts of isostearyl acid phosphate (Sakai Chemical Industry's Phoslex A-180L) was uniformly admixed therewith to give an aluminum pigment composition.

The above aluminum pigment composition was added to 112 parts of the film-forming polymer varnish (A) obtained in Production Example 1. After uniform dispersion, 43 parts of the urethane emulsion (D) obtained in Production Example 4 was added. After uniform dispersion, an aqueous base coating composition (1) was obtained.

Production Examples 9 and 10

Two more aqueous base coating compositions (2) and (3) were prepared in the same manner as in Production Example 8 except the following modifications with regard to the film-forming polymer varnish and urethane emulsion:

Production Example 9

Aqueous Base Coating Compositions (2)

| Film-forming polymer varnish (B) | 80 parts |
|---|---|
| Urethane emulsion (D) | 91 parts |

Production Example 10

Aqueous Base Coating Compositions (3)

| Film-forming polymer varnish (A) | 112 parts |
|---|---|
| Urethane emulsion (E) | 43 parts |

Production Examples 11 to 13

To 15 parts of an aluminum pigment paste (Toyo Aluminium's Alpaste 7160N; Al metal content 65%) was added 30 parts of Cymel 303 (Mitsui Toatsu Chemicals' methoxylated methylolmelamine), followed by addition of 4 parts of the acrylic varnish (G) obtained in Production Example 7. After uniform mixing, 2 parts of isostearyl acid phosphate (Sakai Chemical Industry's Phoslex A-180L) was further admixed uniformly therewith to give an aluminum pigment composition.

Then, three aqueous base coating compositions (4) to (6) were prepared in the same manner as in Production Example 8 using the following further ingredients.

Production Example 11

Aqueous Base Coating Composition (4)

| Film-forming polymer varnish (A) | 80 parts |
|---|---|
| Urethane emulsion (D) | 91 parts |

Production Example 12

Aqueous Base Coating Composition (5)

| Film-forming polymer varnish (B) | 112 parts |
|---|---|
| Urethane emulsion (D) | 43 parts |

Production Example 13

Aqueous Base Coating Composition (6)

| Film-forming polymer varnish (B) | 80 parts |
|---|---|
| Urethane emulsion (F) | 91 parts |

Production Example 14

Aqueous Metallic Coating Composition (P) for Comparison

An aqueous base coating composition (P) was prepared in the same manner as in Production Example 8 except that the film-forming polymer (C) for comparison as obtained in Production Example 3 was used in lieu of the film-forming polymer (A).

Production Example 15

Aqueous Base Coating Composition (Q) for Comparison

An aqueous base coating composition (Q) for comparison was prepared in the same manner as in Production Example 8 except that the aluminum pigment composition was uniformly dispersed in 140 parts of the film-forming polymer (A).

Production Example 16

Production of Base Resin for Powder Clear Coating Composition (I)

A flask was charged with 63 parts of xylene and the temperature was raised to 130° C. Thereto was added dropwise under nitrogen streams over 3 hours a mixture of 55 parts of glycidyl methacrylate, 25 parts of styrene, 20 parts of methyl methacrylate and 8 parts of tert-butyl peroxy-2-ethylhexanoate. Then, after the lapse of 30 minutes, 0.5 parts of tert-butyl peroxyhexanoate was added dropwise over 30 minutes.

After one-hour aging, the solvent was removed to give a solid resin. The solvent removal conditions were as follows: vacuum 5 mmHg, 130° C., 1 hour. The thus-obtained base resin (I) had a Tg (glass transition temperature) of 50° C. and a number average molecular weight of 2,500.

Production Example 17

Production of Base Resin for Powder Clear Coating Composition (II)

A base resin (II) was prepared in the same manner as in Production Example 16 except that the mixture dropped was composed of 55 parts of glycidyl methacrylate, 25 parts of styrene, 5.3 parts of methyl methacrylate, 14.7 parts of ethylhexyl methacrylate and 8 parts of tert-butylperoxy-2-ethylhexanoate. The base resin (II) had a Tg of 35° C. and a number average molecular weight of 2,500.

Preparation of Powder Coating Compositions

Production Example 18

A mixture of 70 parts of the acrylic base rein (I) obtained in Production Example 16, 23.4 parts of 1,10-decanedicarboxylic acids (DDA), 1.0 part of benzoin and 0.30 part of a polysiloxane type surface modifier YF-3919 (product of Toshiba Silicone Co.) was melt-kneaded in a Bussco kneader(product of Buss Co.), then pulverized and classified (150 mesh) to give a powder clear coating composition (1). The COOH/epoxy functional group ratio in this resin composition for powder clear coating was 0.75. The average particle size was 25 μm. The particle size determination was performed on Nikkiso's Microtrack MK-2.

Production Example 19

A powder clear coating composition (2) with an average particle size of 25 μm was prepared in the same manner as in Production Example 18 except that 70 parts of the acrylic base resin (II) obtained in Production Example 17, 23.4 parts of 1, 10-decanedicarboxylic acid, 1.0 part of benzoin and 0.30 part of YF-3919 were used. In the powder clear coating compositions (2), the COOH/epoxy functional group ratio was 0.75.

Production Example 20

A powder clear coating composition (3) with an average particle size of 10 μm was prepared in the same manner as in Production Example 18 except that the pulverization following kneading was performed in the manner of jet grinding. In the powder clear coating compositions (3), the COOH/epoxy functional group ratio was 0.75.

Production Example 21

A powder clear coating composition with an average particle size of 9 μm was prepared in the same manner as in Production Example 20. Then, to 100 parts of this powder clear coating composition was added 2 parts of the non-crosslinking resin in polymer micro particle form as obtained below in Production Example 22. The mixture was drymixed in a Henschel mixer to give a powder clear coating composition (4) in which the noncrosslinking polymer micro particles were adhering to the surface of the powder clear coating composition particles. In the powder clear coating compositions (4), the COOH/epoxy functional group ratio was 0.75.

Production Example 22

Production of Noncrosslinking Resin in Polymer Micro Particle Form

A reaction vessel equipped with a stirrer, a condenser and a temperature controller was charged with 380 parts of deionized water and 2 parts of a nonionic surfactant (Sanyo Chemical industries' MON 2). The mixture was stirred at 80° C. for dissolution. Thereto was added a solution of 1 part of ammonium persulfate in 10 parts of deionized water.

Then, a mixture in solution form composed of 61 parts of methyl methacrylate, 36 parts of styrene and 3 parts of n-butyl methacrylate was added dropwise over 60 minutes. After the dropping, the resultant mixture was stirred at 80° C. for 60 minutes. Thus was obtained an emulsion with a nonvolatile matter content of 20% and a particle size of 0.03 to 0.05 μm. This emulsion was spray-dried to give noncrosslinking polymer micro particles with an SP of 10, a Tg of 110° C. and an average particle size of 0.03 to 0.05 μm.

Examples 1 to 9 and Comparative Examples 1 and 2

Steel panels having an intermediate coat were respectively coated with the aqueous base coating compositions (1) to (6) of the present invention and the compositions (P) and (Q) for comparison as prepared in Production Examples 8 to 13 and Production Examples 14 and 15 in two stages with an interval of 1 minute to a dry film thickness of 20 μm by spraying coated at 23° C. and a humidity of 85%. The paint films were preheated at 80° C. for 2 minutes and then coated by air spraying in the wet-on-wet manner in one stage with one of the powder clear coating compositions (1) to (4) prepared in Production Examples 18 to 21 to a dry film thickness of 60 μm. After 7 minutes of setting, the coated panels were baked at 140° C. for 30 minutes to give test sheets.

The intermediate coated steel sheets used were polished steel plates subjected to chemical treatment and coated and baked with a paint composition for electrodeposition coating of automotive bodies on an intermediate coating line.

The aqueous base coating compositions and the powder clear coating compositions used in the respective examples and comparative examples as well as the results of paint film appearance evaluation, made by the eye, of the test sheets are shown in Table 1. ○ illustrates excellent and × illustrates bad.

TABLE 1

|  | aqueous base coating composition | powder clear coating composition | paint film appearance |
| --- | --- | --- | --- |
| Example 1 | (1) | (1) | ○ |
| Example 2 | (2) | (1) | ○ |
| Example 3 | (3) | (1) | ○ |
| Example 4 | (4) | (1) | ○ |
| Example 5 | (5) | (1) | ○ |
| Example 6 | (6) | (1) | ○ |
| Example 7 | (1) | (2) | ○ |
| Example 8 | (1) | (3) | ○ |
| Example 9 | (1) | (4) | ○ |
| Comparative Example 1 | (P) | (1) | X |
| Comparative Example 2 | (Q) | (1) | X |

We claim:

1. A two coat one bake coating method which comprises applying to a substrate an aqueous base coating composition prepared by dispersing component (c) in an aqueous dispersion composition of a mixture of components (a) and (b) which components comprise:
   (a) 95 to 10% by weight (as solids) of a film-forming vinyl polymer prepared by copolymerizing 8 to 30% by weight of an amido group-containing ethylenic monomer or monomers, 3 to 15% by weight of an acidic group-containing ethylenic monomer or monomers, 10 to 40% by weight of a hydroxyl group-containing ethylenic monomer or monomers and at least one other ethylenic monomer accounting for the balance, said copolymer having a number average molecular weight of 6,000 to 50,000, and neutralizing at least part of the acidic groups of said copolymer;
   (b) 5 to 90% by weight (as solids) an aqueous dispersion prepared by dispersing, in a primary and/or secondary polyamine containing aqueous medium, hydrophilic group-containing oligomers produced by reacting together a hydroxyl-terminated diol compound or compounds having a molecular weight of 100 to 5,000, a diisocyanate compound or compounds and a hydrophilic group-containing compound or compounds having at least one active hydrogen atom within the molecule, wherein the NCO/OH equivalent ratio is 1.1 to 1.9;
   (c) 2 to 100 parts by weight, per 100 parts by weight of the above aqueous dispersion composition (as solids), of a pigment; and
   then applying a clear powder coating composition comprising an epoxy group-containing acrylic resin produced by copolymerizing 35 to 65% by weight of an epoxy group-containing monomer or monomers and 65 to 35% by weight of at least one other ethylenic monomer unreactive with epoxy groups, and a polycarboxylic acid or acids, with an acrylic resin epoxy group/polycarboxylic acid carboxyl group number ratio of 10/6 to 10/10, and baking the coatings.

2. The method according to claim 1, wherein an aqueous base coating composition is an aqueous metallic base coating composition.

3. The method according to claim 1, wherein the powder coating composition has an average particle size of not greater than 15 μm.

4. The method according to claim 2, wherein the powder coating composition has an average particle size of not greater than 15 μm.

5. A two coat one bake coating method which comprises applying to a substrate an aqueous base coating composition prepared by dispersing component (c) in an aqueous dispersion composition of a mixture of components (a) and (b) which components comprise:
   (a) 95 to 10% by weight (as solids) of a film-forming vinyl polymer prepared by copolymerizing 8 to 30% by weight of an amido group-containing ethylenic monomer or monomers, 3 to 15% by weight of an acidic group-containing ethylenic monomer or monomers, 10 to 40% by weight of a hydroxyl group-containing ethylenic monomer or monomers and at least one other ethylenic monomer accounting for the balance, said copolymer having a number average molecular weight of 6,000 to 50,000, and neutralizing at least part of the acidic groups of said copolymer;
   (b) 5 to 90% by weight (as solids) an aqueous dispersion prepared by dispersing, in a primary and/or secondary polyamine or both containing aqueous medium, hydrophilic group-containing oligomers produced by reacting a hydroxyl-terminated diol compound or compounds having a molecular weight of 100 to 5,000, a diisocyanate compound or compounds and a hydrophilic group-containing compound or compounds having at least one active hydrogen atom within the molecule together under the NCO/OH equivalent ratio of 1.1 to 1.9;
   (c) 2 to 100 parts by weight, per 100 parts by weight of the above aqueous dispersion composition (as solids), of a pigment; and
   then applying a clear powder coating composition comprising an epoxy group-containing acrylic resin produced by copolymerizing 35 to 65% by weight of an epoxy group-containing monomer or monomers and 65 to 35% by weight of at least one other ethylenic monomer unreactive with epoxy groups, and a polycarboxylic acid or acids, with an acrylic resin epoxy group/polycarboxylic acid carboxyl group number ratio of 10/6 to 10/10, and baking the coatings, wherein each powder particle in the powder coating composition carries, at least on the surface thereof, polymer microparticles having an average particle size of 0.001 to 10 μm, a glass transition teperature of 50° to 150° C. and a solubility parameter {SP} of 9 to 15.

6. A two coat one bake coating method which comprises applying to a substrate an aqueous base coating composition prepared by dispersing component (c) in an aqueous dispersion composition of a mixture of components (a) and (b) which components comprise:
   (a) 95 to 10% by weight (as solids) of a film-forming vinyl polymer prepared by copolymerizing 8 to 30% by weight of an amido group-containing ethylenic monomer or monomers, 3 to 15% by weight of an acidic group-containing ethylenic monomer or monomers, 10 to 40% by weight of a hydroxyl group-containing ethylenic monomer or monomers and at least one other ethylenic monomer accounting for the balance, said copolymer having a number average molecular weight of 6,000 to 50,000, and neutralizing at least part of the acidic groups of said copolymer;
   (b) 5 to 90% by weight (as solids) an aqueous dispersion prepared by dispersing, in a primary and/or secondary polyamine or both containing aqueous medium, hydrophilic group-containing oligomers produced by reacting a hydroxyl-terminated diol compound or compounds having a molecular weight of 100 to 5,000, a diisocyanate compound or compounds and a hydrophilic group-containing compound or compounds having at least one active hydrogen atom within the molecule together under the NCO/OH equivalent ratio of 1.1 to 1.9;
   (c) 2 to 100 parts by weight, per 100 parts by weight of the above aqueous dispersion composition (as solids), of a pigment; and
   then applying a clear powder coating composition comprising an epoxy group-containing acrylic resin produced by copolymerizing 35 to 65% by weight of an epoxy group-containing monomer or monomers and 65 to 35% by weight of at least one other ethylenic monomer unreactive with epoxy groups, and a polycarboxylic acid or acids, with an acrylic resin epoxy group/polycarboxylic acid carboxyl group number ratio of 10/6 to 10/10, and baking the coatings, wherein an aqueous base coating composition is an aqueous metallic base coating composition, and wherein each powder particle in the powder coating composition carries, at least on the surface thereof, polymer microparticles having an average particle size of 0.001 to 10 μm, a glass transition temperature of 50° to 150° C. and a solubility parameter {SP} of 9 to 15.

7. A two coat one bake coating method which comprises applying to a substrate an aqueous base coating composition prepared by dispersing component (c) in an aqueous dispersion composition of a mixture of components (a) and (b) which components comprise:

(a) 95 to 10% by weight (as solids) of a film-forming vinyl polymer prepared by copolymerizing 8 to 30% by weight of an amido group-containing ethylenic monomer or monomers, 3 to 15% by weight of an acidic group-containing ethylenic monomer or monomers, 10 to 40% by weight of a hydroxyl group-containing ethylenic monomer or monomers and at least one other ethylenic monomer accounting for the balance, said copolymer having a number average molecular weight of 6,000 to 50,000, and neutralizing at least part of the acidic groups of said copolymer;

(b) 5 to 90% by weight (as solids) an aqueous dispersion prepared by dispersing, in a primary and/or secondary polyamine or both containing aqueous medium, hydrophilic group-containing oligomers produced by reacting a hydroxyl-terminated diol compound or compounds having a molecular weight of 100 to 5,000, a diisocyanate compound or compounds and a hydrophilic group-containing compound or compounds having at least one active hydrogen atom within the molecule together under the NCO/OH equivalent ratio of 1.1 to 1.9;

(c) 2 to 100 parts by weight, per 100 parts by weight of the above aqueous dispersion composition (as solids), of a pigment; and then applying a clear powder coating composition comprising an epoxy group-containing acrylic resin produced by copolymerizing 35 to 65% by weight of an epoxy group-containing monomer or monomers and 65 to 35% by weight of at least one other ethylenic monomer unreactive with epoxy groups, and a polycarboxylic acid or acids, with an acrylic resin epoxy group/polycarboxylic acid carboxyl group number ratio of 10/6 to 10/10, and baking the coatings, wherein the powder coating composition has an average particle size of not greater than 15 μm, and wherein each powder particle in the powder coating composition carries, at least on the surface thereof, polymer microparticles having an average particle size of 0.001 to 10 μm, a glass transition temperature of 50° to 150° C. and a solubility parameter {SP} of 9 to 15.

8. The method according to claim 1, wherein the polycarboxylic acid is decanedicarboxylic acid.

9. The method according to claim 2, wherein the polycarboxylic acid is decanedicarboxylic acid.

10. The method according to claim 3, wherein the polycarboxylic acid is decanedicarboxylic acid.

11. The method according to claim 4, wherein the polycarboxylic acid is decanedicarboxylic acid.

12. The method according to claim 1, wherein the epoxy group-containing acrylic resin is a copolymer of 55 to 65% by weight of an epoxy group-containing monomer or monomers and 45 to 35% by weight of at least one other ethylenic monomer unreactive with epoxy groups.

* * * * *